US009920397B2

United States Patent
Aguilar et al.

(10) Patent No.: US 9,920,397 B2
(45) Date of Patent: Mar. 20, 2018

(54) REMOVAL OF FERRIC IRON AS HEMATITE AT ATMOSPHERIC PRESSURE

(71) Applicant: BHP Billiton SSM Development Pty Ltd, Perth, Western Australia (AU)

(72) Inventors: Renato Antonio Loaiza Aguilar, Cordobo (CO); Carolina Isabel Meneses Rodríguez, Cordobo (CO); Ruben Rangel De Hoyos, Cordobo (CO); Houyuan Liu, Henderson, NV (US)

(73) Assignee: CERRO MATOSO SA, Bogota (CO)

( * ) Notice: Subject to any disclaimer, the term of this patent is extended or adjusted under 35 U.S.C. 154(b) by 107 days.

(21) Appl. No.: 14/408,124

(22) PCT Filed: Jun. 21, 2013

(86) PCT No.: PCT/AU2013/000666
§ 371 (c)(1),
(2) Date: Dec. 15, 2014

(87) PCT Pub. No.: WO2013/188922
PCT Pub. Date: Dec. 27, 2013

(65) Prior Publication Data
US 2015/0152519 A1  Jun. 4, 2015

(30) Foreign Application Priority Data

Jun. 22, 2012 (AU) ................................. 2012902621

(51) Int. Cl.
*C22B 3/44* (2006.01)
*C22B 3/00* (2006.01)
(Continued)

(52) U.S. Cl.
CPC .............. *C22B 3/44* (2013.01); *B01D 9/0036* (2013.01); *B01D 9/0059* (2013.01);
(Continued)

(58) Field of Classification Search
None
See application file for complete search history.

(56) References Cited

U.S. PATENT DOCUMENTS 5,378,262 A * 1/1995 Mihaylov ............ C01G 51/003
423/139
7,329,396 B2 * 2/2008 Harris ....................... C22B 3/44
423/140

(Continued)

FOREIGN PATENT DOCUMENTS

AU  2007204591  7/2007

OTHER PUBLICATIONS

PCT/AU2013/000666 International Search Report dated Oct. 1, 2013 (3 pages).

*Primary Examiner* — Melissa S Swain
(74) *Attorney, Agent, or Firm* — Brinks Gilson & Lione; G. Peter Nichols

(57) ABSTRACT

A process for the removal of ferric iron as hematite from a nickel solution containing ferric and ferrous ions including the steps of: raising the temperature of the nickel solution to between 90° C. and the boiling point of the solution at atmospheric pressure; raising the pH of the nickel solution to be between 2 and 3; and adding a hematite seed to facilitate hematite precipitation, wherein ferric ions are precipitated as hematite in a predominantly crystalline form.

20 Claims, 1 Drawing Sheet

(51) Int. Cl.
  *B01D 9/00* (2006.01)
  *C22B 3/26* (2006.01)
  *C22B 3/42* (2006.01)
(52) U.S. Cl.
  CPC .............. *C22B 3/0005* (2013.01); *C22B 3/42* (2013.01); *C22B 23/0461* (2013.01); *Y02P 10/234* (2015.11)

(56) References Cited

U.S. PATENT DOCUMENTS 7,559,972 B2 * 7/2009 Liu ..................... C22B 23/0461
  75/743
2001/0001650 A1   5/2001 Duyvesteyn et al.

\* cited by examiner

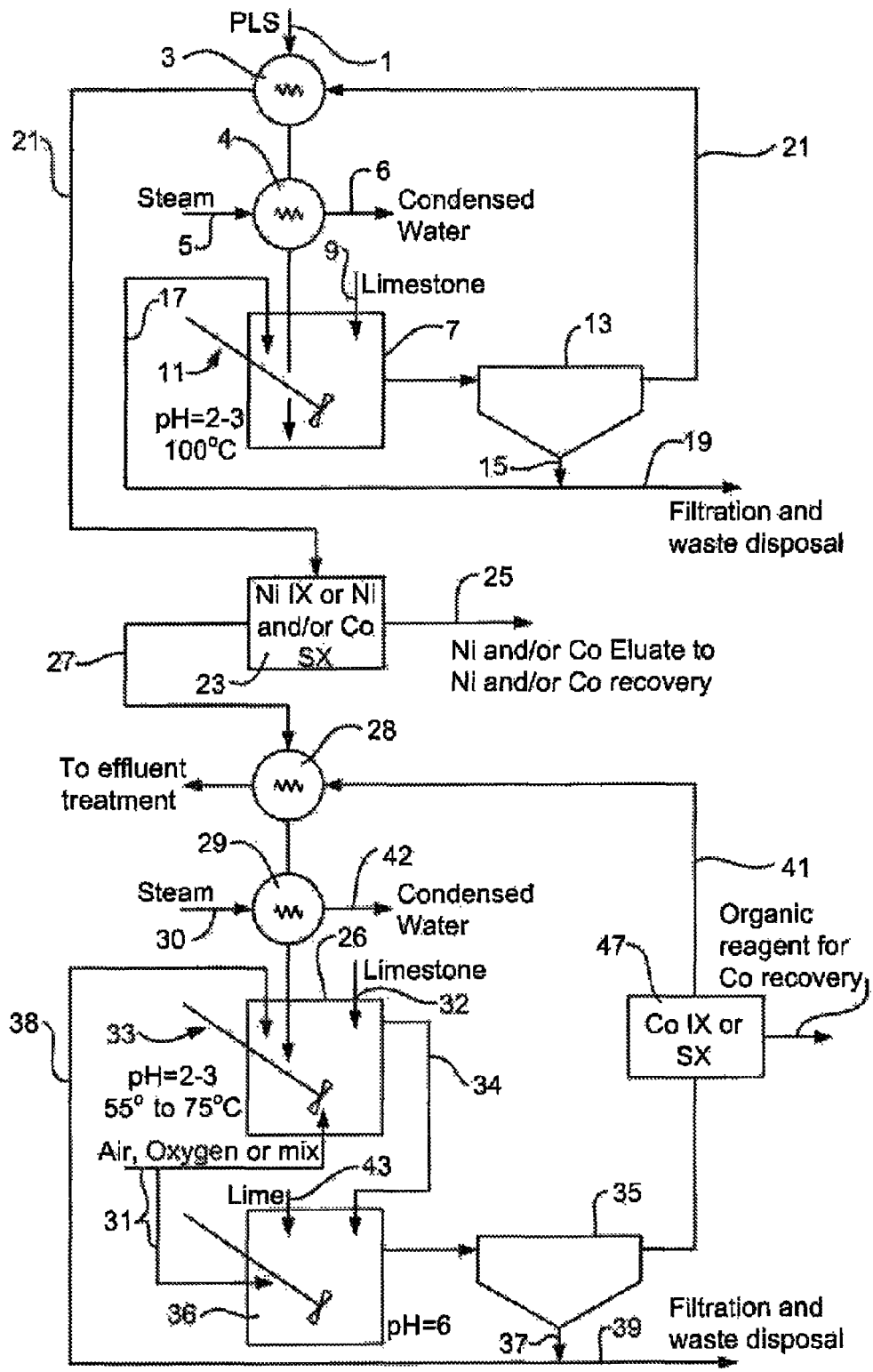

REMOVAL OF FERRIC IRON AS HEMATITE AT ATMOSPHERIC PRESSURE

This application claims priority to International Application No. PCT/AU2013/000666 filed Jun. 21, 2013 and Australian Application No. 2012902621 filed Jun. 22, 2012; the entire contents of each are incorporated herein by reference.

This invention relates to a process for the removal of ferric iron as hematite at atmospheric pressure from a nickel solution containing ferric and ferrous iron. The process is particularly relevant to an impurity removal step from a nickel solution, particularly a nickel sulfate solution that is part of an overall process for the recovery of nickel and/or cobalt from such a solution. In one embodiment, the nickel sulfate solution may be produced as part of a heap leach process for the recovery of nickel and/or cobalt from a nickel laterite ore. The process may however be applied to other atmospheric acidic leach (AAL), for example atmospheric agitation leach processes where such a solution is produced, and where iron precipitation as hematite is desired before the recovery of the metal value.

In a preferred embodiment, the process relates to an impurity removal step in a heap leach process where ferric ions are precipitated as hematite, predominantly in a crystalline form. This is achieved by controlling and raising both the temperature and pH conditions, and seeds application of the solution in order to achieve hematite precipitation in a crystalline form at atmospheric pressure.

In another embodiment, nickel may be recovered from the nickel solution, substantially free of ferric iron, in an ion exchange process, most preferably where the IX device is ISEP™.

In another embodiment, nickel and/or cobalt may be recovered from the nickel solution, substantially free of ferric iron, in a solvent extraction process, preferably with the use of the commercial solvent reagent Cyanex 301™ and/or Cyanex 272™.

BACKGROUND OF THE INVENTION

Laterite ores are potentially the world's largest source of nickel and cobalt. In general, most deposits of nickel/cobalt laterites contain three major zones based on lithology, mineralogy and chemical composition. These three zones from the base to the surface, are the saprolite zone, the transition zone and the limonite zone, and generally sit atop weathered bedrock material. There is generally a large variation in total thickness of the laterite deposit, as well as individual zone thickness.

The saprolite zone consists predominantly of "saprolitic serpentine minerals" and a large variety of nickel/magnesium silicate minerals. It contains between 0.5% wt and 4% wt nickel and a high magnesium content, which is normally over 6% wt. The cobalt to nickel weight ratio of saprolite is normally less than 1:10.

The limonite zone, located on the top zone of lateritic ore body, contains nickel ranging from about 0.5% wt to 1.8% wt and consists of goethite-rich, magnetite-rich and/or hematite-rich ore, which is rich in iron, nickel and cobalt content. As it is the top zone, it is subjected to greater weathering and oxidation, which is characterised by a decrease in magnesium and ferrous iron content, and an increase in the ferric iron content. Therefore, it has lower magnesium content than saprolitic type ore. Due to stronger weathering and oxidation, limonitic ore contains dominantly fine and soft particles of goethite and/or hematite. Sometimes weathering and oxidation have not been fully completed and either hematite or goethite rich sections are not present. Alternatively, depending upon the climatic condition, there is formation of clay-type laterites that contain nickel and/or cobalt containing iron/magnesium/aluminium silicates, such as smectite, nontronite and chlorite.

The transition zone is not normally well defined and is composed essentially of limonite and saprolite. It also commonly contains nickel in the range of from 1% wt to 3% wt. with co-existing cobalt ranging from 0.08% wt up to 0.3% wt.

Cobalt existence in zones of saprolite, limonite and transition is generally associated with asbolane, a mineral of hydrated manganese oxide. The cobalt value of a laterite ore deposit is mostly recovered from the limonitic and transition zones.

Although laterite ore deposits are exploitable with surface mining, they have historically been overlooked in favour of underground sulfide deposits as the nickel is readily concentrated by floatation techniques. This is despite the abundant source of nickel bearing laterite ore. Most laterites are generally considered a lower grade of nickel bearing ore for conventional whole ore processing, and more difficult to recover the nickel than from sulfide ores. However, as sulfide ore deposits begin to disappear, lateritic nickel ore deposits are increasingly becoming an important source of nickel and cobalt.

The conventional processes for extracting nickel and cobalt from lateritic ores are generally confined to expensive and/or energy consuming methods. For example, it is known to directly smelt laterite ore, which is quite an energy consuming process. In particular, the saprolitic component may be processed by pyrometallurgical means such as a rotary kiln and electric furnace (RKEF) process to make ferronickel. The limonite component of the laterite ore is generally processed in a hydrometallurgical process, such as a high pressure acid leach (HPAL) process with concentrated sulfuric acid.

Alternative means are being developed such as an atmospheric leach which may take place in agitated vats or tanks. Heap leaching is another method currently being developed for economically extracting metals from ores that may not be suitable for either RKEF, HPAL or indeed atmospheric tank processes.

The leach solution or lixiviant in hydrometallurgical processes for the processing of nickel laterite ores is typically sulfuric acid, although other mineral acids such as hydrochloric or nitric acid are also utilised in certain circumstances. Processes are being developed where the lixiviant includes acid fortified fresh or salinated waters. The pregnant leach solution (PLS) from a sulfuric acid leach from a laterite ore, will produce a sulfate solution that will generally include the desired nickel and cobalt ions together with impurities such as ferrous and ferric ions, aluminium, chromium, manganese and magnesium ions in varying quantities depending upon quality of the PLS and the type of ore being leached.

Nickel and cobalt may be recovered from such solutions by a number of varying techniques. For example, conventional multi-stage neutralisation and sulfidation, ion exchange, solvent extraction, electrowinning and pyrohydrolysis are all well-established techniques in order to recover nickel and cobalt from a nickel PLS solution. Downstream processing in order to recover the nickel is dependent upon adequately removing impurities from the solution.

Because the high iron to nickel concentration ratio in the laterite ore leads to a high iron to nickel concentration ratio in the PLS, the removal of iron with the least nickel and cobalt loss becomes a key step in the recovery of nickel and/or cobalt from such solutions as iron is the most significant impurity in processing nickel laterite ores. Ideally the tailing should be stackable to reduce weight, volume and moisture content.

The major morphological states of iron precipitation are hematite, goethite, hydroxide and jarosite, depending on applied temperature, pH and additives in the iron removal step, for example the presence of alkaline ions will generally result in jarosite precipitation. Hematite and jarosite have higher crystallinity than goethite. Ferric hydroxide is amorphous. As crystallinity of the precipitation product plays a key role in the solid physical properties, for example specific surface area, surface absorption capacity, filter permeability and moisture content, the operational criteria such as the nickel/cobalt loss, solid/liquid separation behaviour and tailings stackability of an iron precipitation depends on its morphology and is generally in the order of hematite, then jarosite, followed by goethite then hydroxide.

In the acid leaching of lateritic ore, the conventional high pressure acid leaching (HPAL) process was developed to dissolve nickel and cobalt and precipitate almost all solubilised ferric iron to insoluble hematite. This was achieved in autoclaves operated at high temperatures (250° C.-300° C.) and associated pressures (around 50 bar). HPAL methods recover high percentages of nickel and cobalt but require expensive, sophisticated equipment to withstand the high pressure and temperature operating conditions.

Alternatives to HPAL processes have been disclosed, for example, tank or vat atmospheric acid leaching (AAL) where the process is generally operated at temperatures to 110° and atmospheric pressure. One such disclosure is U.S. Pat. No. 6,261,527 in the name of BHP Minerals International, Inc., which describes the sequential leaching of limonite and saprolite fractions of laterite ore with sulfuric acid at atmospheric pressure and temperatures below the boiling point, precipitating and discarding most of the dissolved iron as insoluble jarosite solids.

Although jarosite precipitation has good solid/liquid separation behaviour and can trap considerable $SO_4^{2-}$ from the leachate, the drawback most notably is that it has a low iron content, therefore a high residue weight and volume is generally produced.

There are also serious environmental concerns with the removal of iron as jarosite, as the jarosite compounds are thermodynamically unstable. Jarosite may decompose slowly to iron hydroxides releasing sulfuric acid. The released acid may re-dissolve traces of precipitated heavy metals, such as manganese, chromium, nickel, cobalt, copper and zinc, present in leach residue tailings, thereby mobilising these metals into the underground or surface water around the tailings deposit.

Another disadvantage of jarosite precipitation is that jarosite contains sulfate, and this increases the acid requirement for leaching significantly. Sulfuric acid is usually the single most expensive input in acid leaching processing, so there is also an economic disadvantage in the jarosite process.

Other processes such as Australian patent 2003209829 in the name of BHP Billiton SSM Development Pty Ltd, disclose processes where iron is precipitated as goethite in a sequential atmospheric acid leach (AAL) of limonite and saprolite. Whereas goethite is not as potentially environmentally damaging as jarosite, the mass of iron removal per volume is not as significant as hematite. In addition, goethite also has lower solid/liquid separation behaviour than hematite. This causes a high moisture content leading to difficulties in disposing of the residue.

Australian application 2009201837, also in the name of BHP Billiton SSM Development Pty Ltd, discloses an atmospheric acidic leach (AAL) process where the limonite fraction is processed in a primary leach step, and the saprolite fraction is introduced to the discharge slurry from the primary leach step, together with a hematite seed, in order to initiate hematite precipitation.

There are a number of known techniques to recover nickel and/or cobalt from nickel sulfate solutions. One means in which to recover nickel and/or cobalt from an acidic PLS is with an ion exchange (IX) resin in an IX process. Known ion exchange resins would include a functional group of bis-picolylamine to separate nickel completely from impurities such as ferrous, aluminium, chromium, magnesium and manganese ions and partially from ferric ions. DOWEX M4195™ is a typical resin known for such purposes as it has a higher affinity for nickel ions than ferric ions, but the difference is about two to three folds. If the ferric/nickel concentration ratio in solution is higher or comparable to the resins affinity order, considerable ferric ions are absorbed onto the resin. This leads to a low separation efficiency of nickel over ferric ions.

Another recognised means is by solvent extraction (SX). Commercial reagents such as Cyanex 301™ may be used at low pH. This reagent however also has a high affinity for ferric ions. Given the high affinity for ferric ions, and that the reagent may be degraded by the oxidant ferric ions, it becomes critical to remove ferric ions if this reagent is to be used to recover nickel and/or cobalt.

Laterite ores have a high ferric iron to nickel concentration ratio, and the PLS from an acid leach of a laterite ore will also have a high ferric iron to nickel concentration ratio. As a result, the effective capacity of the resin in an IX process to load nickel, or an organic reagent in an SX process, is reduced, given that it will also load considerable quantities of ferric iron. In an IX process, this leads to a need for high investment in IX resin volume and equipment number to maintain a given nickel production capacity. In addition, the high iron content in the IX eluate increases the reagent consumption needed to recover nickel from the solution, for example, as a nickel hydroxide product.

The present invention aims to overcome or alleviate one or more of the problems associated with prior art processes by developing processes where iron is removed as an impurity as hematite in a process conducted at atmospheric pressure It is a desired feature of the process that ferric iron is precipitated as hematite in a crystalline form, in an impurity removal step, that makes it more readily disposed of in residue tailings.

In a further desired feature, hematite is precipitated in a crystalline form in an atmospheric pressure step. This has the advantage of avoiding precipitation of iron as unstable jarosite, or goethite which is stable but suffers from relatively high nickel/cobalt loss during precipitation, solid/liquid separation and disposal difficulties due to the amorphous form and high moisture content. Hematite may be precipitated in a more crystalline form, which achieves a compact and "stackable" residue.

It is further a desired feature of the invention to remove ferric ions from a nickel solution prior to any ion exchange process, so as to avoid ferric ions competing with nickel on the resin. Alternatively, it is a desired feature to remove ferric ions from the nickel solution prior to any solvent extraction process, so as to avoid reagent degradation, or iron loading on to the reagent.

A reference herein to a patent document or other matter which is given as prior art is not to be taken as an admission that that document or matter was known or that the information it contains was part of the common general knowledge as at the priority date of any of the claims.

BRIEF OUTLINE OF THE INVENTION

The present invention resides in a process for the removal of ferric ions as hematite from an acidic nickel solution at atmospheric pressure, preferably a nickel sulfate solution. Generally the process relates to removal of ferric ions in an impurity removal step when processing the pregnant leach solution (PLS) from a sulfuric acid leach of a nickel laterite ore. In a most preferred embodiment, the sulfuric acid leach is a heap leach process.

The process involves the control by raising both the temperature and pH conditions of the PLS at atmospheric pressure to control the morphology of ferric ion precipitation as hematite. In addition, the applicants have found that maintaining elevated temperatures of the nickel solution and maintaining the pH at certain levels, together with the addition of a hematite seed, it is possible to precipitate ferric ion as hematite in a predominantly crystalline form at atmospheric pressure.

Accordingly, in a first embodiment of the invention, there is provided a process for the removal of ferric ions as hematite from an acidic nickel solution containing ferric and ferrous ions including the steps of:
  i) raising the temperature of the nickel solution to between 90° C. and the boiling point of the nickel solution at atmospheric pressure;
  ii) raising the pH of the nickel solution between 2 and 3; and
  iii) adding a hematite seed to facilitate hematite precipitation;
wherein ferric ions are precipitated as hematite in a predominantly crystalline form.

Preferably, the pH is raised by adding limestone or saprolite, however any suitable neutralizing agent may be used. Saprolite is a weak alkaline (pH of about 8 in water), and has a similar neutralisation function as limestone from the point of view of pH control. It has also been found that with the addition of saprolite to raise the pH, that more nickel may be leached as additional acid produced during iron precipitation will leach the added saprolite.

When saprolite is used as the neutralising agent, in a preferred embodiment, the amount of hematite seed added is at a dose of at least a weight ratio of 1:1 to the added saprolite, preferably a ratio of at least 3:1. In another embodiment, the ratio may be at least 5:1. The amount of saprolite slurry added should be sufficient to raise and maintain the pH of the nickel solution to be between a pH of 2 to 3. When limestone is used as the neutralising agent, the hematite seed dose is preferably 100% (1:1) to at least 300% (3:1) of the hematite to be formed during ferric ion precipitation. Preferably, the limestone dose added is in a ratio of 1:1 to 1:1.3 of the stoichiometric weight of the precipitated ferric ions.

The key fraction with neutralisation capacity in saprolite is nickel containing magnesium silicate (serpentine and lizardite). Limestone is a much stronger and purer alkaline agent with greater neutralising capacity than saprolite. When saprolite is used as the neutralising agent, more saprolite is required than would limestone to raise and maintain the pH within the desired range and to precipitate the ferric ions. In addition, the iron precipitation efficiency of saprolite is low and cannot completely precipitate the ferric. Normally, it has a capacity to precipitate about 80% to 90% of the ferric because there is a balance between saprolite mineral composition and the residual ferric ion concentration at a given temperature and pH. When saprolite is used, it is therefore desirable to include a consecutive neutralisation scavenger step by adding a stoichiometric amount of limestone slurry to the reactor to scavenge the residual ferric ions in solution.

The amount of limestone added if a scavenger step is required following a saprolite neutralisation step, preferably is in the order of a ratio of 1:1 to 1.3:1 of the stoichiometric weight of residual ferric ion.

The Applicants have found that if ferric ions are precipitated as hematite in a predominantly crystalline form, this form of waste material is more readily disposed of as it is a more compact and "stackable" form than an amorphous form. Hematite has considerably less moisture content than either goethite, hydroxide or jarosite, and so more readily lends itself to be able to form a crystalline structure that is more readily disposed of as it can be piled in a residue tailings without losing form.

Hematite has the formula form of $Fe_2O_3$, and precipitation of iron as hematite has several advantages over goethite and jarosite. Hematite has higher density and iron content as it includes a higher weight percentage of iron in the residue than goethite (FeOOH or $Fe_2O_3.H_2O$), iron hydroxide ($Fe(OH)_3$ or $Fe_2O_3.3H_2O$) and jarosite ($MeFe_3[(SO_4)_2(OH)_6]$) where Me is Na, K, or $NH_4$. Therefore the weight, volume and moisture content of waste solid disposal with iron treatment are decreased. The Applicants have found that by maintaining temperatures as close as possible to the boiling point of the solution at atmospheric pressure, preferably about 100° C., and at a pH range of 2-3, preferably 2.0-2.5, hematite will precipitate in a generally crystalline form with application of hematite seed.

The process of the invention is suitable for treatment of any PLS that is produced following an acid leach, preferably a sulfuric acid leach, but other acid systems such as citric, nitric, hydrochloric or acid supplemented saline lixiviant systems. The PLS may be the product of an atmospheric acid or agitation leach, or a heap leach process. In a preferred embodiment, the PLS is the product from a sulfuric acid heap leach process, particularly a counter-current heap leach process, where the PLS has been applied through more than one heap.

The PLS following such a process will include not only the desired nickel and cobalt values, but also impurities including ferric and ferrous ions, aluminium, chromium, manganese and magnesium.

In a particularly preferred embodiment, following the ferric iron removal from the PLS, nickel is recovered in an ion exchange (IX) process or solvent extraction (SX). The process of the invention does however lend itself to recovery of nickel through other process steps, such as conventional multi-stage neutralisation and sulfidation, electrowinning or pyrohydrolysis however the removal of ferric iron makes either IX or SX recovery of nickel the preferred processes.

In a most preferred form, the nickel is recovered in an IX process. In a preferred embodiment, the IX device is ISEP™.

In a nickel IX recovery process, a preferred IX resin is a bis-picolylamine chelating resin to concentrate and separate nickel from impurities such as ferrous ions, aluminium, chromium, magnesium and manganese. A preferred IX resin is DOWEX M4195™ or its derivative Dowex XUS43578™, however other suitable resins include iminodiacetate acid chelating resins such as Amberlite IRC 748™, Purolite S930™ and Lewatit TP207™. The bis-picolylamine resin has a considerable affinity for both nickel and ferric ions and as such, the efficiency for nickel recovery in such an IX process is enhanced if ferric ions are removed from the PLS before the IX process. The iminodiacetate resin has a much higher affinity to ferric ions than nickel ions so that the removal of ferric ions from the PLS becomes critical if that resin is used in the IX process.

In a nickel IX process, any nickel absorbed on to the resin may be eluted with an acid, preferably sulfuric or hydrochloric acid. This will produce a nickel containing eluate substantially free of ferric ions. This eluate may be further processed to recover the nickel as a high grade nickel product, for example by recovering the nickel as a nickel hydroxide precipitate. In a preferred embodiment, this is achieved by neutralizing the nickel concentrated IX eluate, preferably with magnesium oxide, soda ash, caustic soda (sodium hydroxide) or other alkali to a pH of from 7 to 9 at 40° C. to 50° C., so as to precipitate nickel as a nickel hydroxide precipitate with a nickel grade of greater than 30% wt. This nickel product itself may be further processed to make battery material, nickel nuggets, nickel cathode or crystalline nickel sulfate for electric coating.

Alternatively, nickel, or if there is sufficient cobalt present, nickel and/or cobalt may be recovered in a primary solvent extraction process after ferric ion removal. A preferred organic reagent for this step is Cyanex 301™ with a functional group Bis(2,4,4-trimethylpentyl)dithiophosphinic acid as it is able to recover both nickel and if desired, cobalt at the same time at low pH, for example, pH of 1.5 to 3.0. The nickel and cobalt may be recovered from the SX eluate from this primary SX step by, for example a secondary SX step, with Cyanex 272™, which is specific for cobalt over nickel at pH 5.5 to 6.0, or alternatively by IX.

Another alternative is that the nickel may be recovered by the IX step as described while cobalt is recovered from the nickel IX raffinate in a consecutive SX step with, for example Cyanex 301™, prior to further processing of the nickel IX raffinate for waste disposal.

The nickel IX or nickel/cobalt primary SX raffinate may be further treated in order to remove the ferrous iron present in the raffinate as a crystalline, compact and stackable hematite containing residue. Initially, ferrous ions are oxidised to ferric, preferably by the sparging of air, oxygen or an air/oxygen mix into the raffinate. The temperature of this solution is maintained to be between 40° C. and the boiling point, preferably between 50° C. and 80° C., and most preferably between 55° C. to 75° C. while the pH of the raffinate is maintained between 2 and 3, preferably 2.0 to 2.5. Limestone or saprolite may be added in order to control the pH. A hematite seed is added to facilitate precipitation of ferric ions as hematite.

The pH of the slurry is then raised to about 6 to ensure complete precipitation of iron, aluminium, chromium and some manganese. At this pH, ferric and ferrous ions may completely precipitate as either hematite and/or magnetite in a predominantly crystalline form.

In a further alternative cobalt recovery step, in order to decrease the interference of ferrous ions caused by high concentrations of $Fe^{2+}$ over $Co^{2+}$ cobalt may be efficiently recovered by IX and/or SX after the steps of removing both ferric and ferrous ions from the resultant solution. Following solid/liquid separation from the hematite and/or magnetite precipitation step, cobalt may be recovered from the substantially ferric and ferrous iron free raffinate by SX or IX. If SX is used, the preferred reagent is Cyanex 272™ with a functional group Bis(2,4,4-trimethylpentyl)phosphinic acid which has high affinity for cobalt, particularly at a pH of about 5.5 to 6.0. If IX is used, a preferred resin is a bis-picolylamine functional chelating resin such as Dowex M4195™ or its derivative Dowex XUS43578™ or an iminodiacetate acid chelating resin such as Amberlite IRC 748™, Purolite S930™ and Lewatit TP207™. The remainder of the raffinate, following cobalt removal is sent for effluent treatment.

DETAILED DESCRIPTION OF THE INVENTION

FIG. 1 illustrates a preferred embodiment of the invention. It should be understood however that this embodiment is merely an example of the process steps and the invention should not be considered to be limited specifically to this embodiment.

In FIG. 1, a PLS (1) from an atmospheric acid leach (AAL), which may either have been a heap leach or atmospheric agitation leach, is processed. This PLS contains nickel and/or cobalt values together with impurities including both ferric and ferrous ions, aluminium, chromium, manganese and magnesium. This PLS is treated in accordance with the invention so as to remove ferric ions, predominantly as hematite in a predominantly crystalline form, as an initial step.

The temperature of the PLS is elevated to about 100° C. with two stage heat exchangers (3) and (4) with the addition of steam (5). Condensed water (6) is released from heat exchanger (4). The heated PLS is then processed in tank (7).

The temperature of the PLS is maintained at about 100° C. but may exist anywhere from 90° C. to the boiling point of the solution at atmospheric pressure. Limestone or saprolite (9) is added to raise the pH to be within the range of from 2 to 3. The solution is stirred with impeller (11). An initial quantity of hematite may be added as a seed to facilitate ferric ion precipitation as hematite.

The slurry from tank (7) is transferred to a liquid/solid separation device such as thickener (13). Other commercial devices such as counter-current decantation (CCD) may also be used. The hematite containing underflow (15) from thickener (13) is discharged while the liquid overflow (21) is sent for nickel recovery, for example by IX via heat exchanger (3). A portion of hematite containing underflow (15) from thickener (13) is returned as stream (17) to tank (7) to act as a continuous supply of hematite seed in order to continue hematite precipitation. The remainder of the solid hematite containing underflow (15) is filtered and disposed as solid waste (19). The hematite residue will precipitate in a predominantly crystalline and compact form which is readily "stacked" in a tailings site.

The Applicants have found that it is particularly advantageous to produce a residue that may be dry stacked. Most laterite ores are processed in wet tropical environments and the disposal of iron residues such as goethite or hydroxide, which are generally amorphous, cannot be dry stacked as they are difficult to filter to acceptable low moisture content. The Applicants have found that a crystalline hematite residue has greater ability to be filtered and the moisture content sufficiently low to allow it to be disposed of in a compact and stackable form. This is particularly advantageous in wet tropical environments.

The liquid overflow (21) from thickener (13) contains both nickel and cobalt together with other impurities such as ferrous ions, aluminium, chromium, manganese and magnesium, but is substantially free of ferric ions. This overflow passes through heat exchanger (3) to release heat to the PLS and transferred to nickel IX or nickel and/or cobalt SX step (23).

The Applicants have found that the preferred process for nickel recovery is IX. Most preferably for a nickel IX step, the ion exchange device is an ISEP™.

If there is sufficient cobalt present to warrant cobalt recovery, the process may employ a primary solvent extraction (SX) step, where nickel and cobalt are separated from the PLS with the use of organic reagents such as Cyanex 301™ with a functional group Bis(2,4,4-trimethylpentyl) dithiophosphinic acid. Nickel may be recovered along with the cobalt from the SX eluate through this primary SX step. The primary SX raffinate will include ferrous ions, chromium, aluminium, manganese and magnesium. The benefits of Cyanex 301™ for the SX step become more evident once ferric has been removed from the PLS, as Cyanex 301™ has a higher affinity for ferric over nickel and cobalt, and is susceptible to being destroyed through oxidation by ferric ions.

The eluate from this primary SX process may then be treated for nickel and cobalt separation. An example of how nickel and cobalt may be separately recovered is by a secondary SX process, for example with Cyanex 272™ with a functional group Bis(2,4,4-trimethylpentyl)phosphinic acid, which has a strong affinity for cobalt over nickel at pH of about 5.5 to 6.0. Cobalt may then be recovered from the eluate from the secondary SX process while nickel may be recovered from the raffinate from the secondary SX process.

The nickel and/or cobalt eluate (25) from the nickel IX or SX processes is sent for nickel and/or cobalt recovery. The nickel and cobalt may be recovered by any known means such as conventional multi-stage neutralisation and sulfidation, electrowinning, pyrohydrolysis or further IX and SX steps. One preferred means to recover the nickel is as a hydroxide precipitate by raising the pH, for example with magnesium oxide, soda ash, caustic soda or other alkali. One suitable means to recover the nickel is to raise the pH to about 7 to 9 and maintain the solution at about 40° C. to 50° C. so as to precipitate nickel as a nickel hydroxide precipitate. Other means for nickel recovery include electrowinning, pyrohydrolysis or sulfidation.

As another alternative, nickel may be recovered from the liquid overflow (21) by IX as described, while cobalt is recovered from the nickel IX raffinate in a consecutive cobalt SX step. A preferred organic reagent for the cobalt recovery step is Cyanex 301™ reagent, having a functional group Bis(2,4,4-trimethylpentyl)dithiophosphinic acid, which has an affinity for cobalt over impurities such as aluminium, manganese, chromium and magnesium at low pH for example of 1.5 to 3.0.

The raffinate from the nickel IX or primary SX process (27) is then treated to remove ferrous ions from the solution. The temperature of the raffinate is maintained at about 40° to the boiling point, but preferably 50° C. to 80° C. and most preferably around 55° C. to 75° C. through two stage heat exchangers (28) and (29) with the addition of steam (30). Condensed water (42) is released. At lower temperature, the Applicants have found ferrous ion oxidation/precipitation may be controlled by oxygen mass transfer. Lower temperatures increase solubility of oxygen in liquid, so the Applicants have found oxidation of ferrous to ferric is controlled at temperatures of from 55° C. to 75° C.

The raffinate is then transferred to agitation tank (26). The pH of the raffinate is maintained between 2 and 3, preferably 2.0 to 2.5, by the addition of limestone or saprolite (32), while the temperature preferably is maintained at about 55° C. to 75° C. Air, oxygen or air/oxygen mix (31) is sparged to oxidise the ferrous ions to ferric ions then precipitate the ferric ions as hematite, while the slurry is stirred with impeller (33). An initial hematite seed may be added to facilitate precipitation of iron as hematite.

The slurry (34) is then transferred to a further tank (36) where the pH is raised to about 6 with lime (43) with the addition of air, oxygen or air/oxygen mix (31), while preferably maintaining the temperature around 55° C. to 75° C., to ensure complete removal of iron and other impurities such as aluminium and chromium. Ferric ions may precipitate as hematite and/or magnetite ($FeO.Fe_2O_3$) when ferrous is oxidised to ferric, particularly as magnetite becomes more predominant if the pH of the solution resides above 4.

At pH 6, all ferric, ferrous, aluminium, chromium and some manganese ions are removed, while magnesium ions will stay in solution. The solution may then by transferred to a solid/liquid separation device such as thickener (35) where iron and other impurities containing solid are separated as thickener underflow (37). The majority of the underflow is filtered and disposed as waste (39). A proportion of the hematite containing underflow (38) is transferred back to tank (26) to act as a continuous hematite seed for the precipitation of iron as hematite. The hematite and/or magnetite will be precipitated in a substantially crystalline form which facilitates disposal as the residue is compact and can be "stacked" to greater heights than those iron residues in a more amorphous form.

The overflow raffinate solution (41) from thickener (35), substantially free of ferric ions, ferrous ions, aluminium and chromium may be treated for cobalt recovery, if the cobalt loss or recovery in an earlier SX step has not been significant in the process. Cobalt recovery may be enhanced if carried out in this step as it avoids any potential interference of high concentration of ferrous ions over cobalt. Cobalt recovery (47) may be by IX using a resin with a bis-picolylamine functional group such as Dowex M4195™ or its derivative Dowex XUS43578™ or resins with iminodiacetate functional group such as Amberlite IRC 748™, Purolite S930™ or Lewatit TP207™. Alternatively, cobalt may be recovered by solvent extraction using organic reagents such as Cyanex 272™ with a functional group Bis(2,4,4,-trimethylpentyl) phosphinic acid which at pH of about 5.5 to 6.0 has a high affinity for cobalt.

Following cobalt recovery, if any, overflow stream (41) is then transferred via heat exchanger (28) to release its heat to input stream (27) for effluent treatment to completely remove any manganese or magnesium. The treated effluent decreases the need for the use of lime in downstream effluent neutralisation. The treated effluent could be used as a rinsing solution for IX processing or filtration.

The invention described herein is susceptible to variations, modifications and/or additions other than those specifically described and it is to be understood that the invention includes all such variations, modifications and/or additions which fall within the spirit and scope of the above description.

EXAMPLES

Example 1: Preparation of Pregnant Leach Solution (PLS) and Hematite Seeds

The limonite and saprolite samples for tests were taken from a laterite ore body. Table 1 illustrates the composition.

Mineralogy investigation indicated that the major nickel containing minerals were goethite (50-60% wt) in limonite and lizardite (25% wt) in saprolite. The hematite content in both of limonite and saprolite was minor (<5%). The preparation of a pregnant leach solution (PLS) was carried out in a 3 liter glass reaction vessel in a temperature controlled heating mantle fitted with a condenser vented to atmosphere. Polypropylene baffles were placed inside the reaction vessel and an overhead stirrer fitted with a titanium impeller was used for agitation. With designed sulphuric acid/limonite weight ratio of 1.4, 875 gram limonite slurry (solid concentration: 25% wt) was mixed with 165 ml 98% $H_2SO_4$ with density of 1.84 g/ml at 100° C. for three hours. The final concentration of nickel and iron were 3.0 g/L and 106 g/L respectively. The weight loss of limonite ore was over 90%. After filtration, the obtained PLS was used for iron precipitation as hematite.

Hematite seed was prepared by a pressure acid leaching (PAL) process. A limonite slurry with a solids concentration of 25 wt % was added to an autoclave with concentrated sulphuric acid with acid/limonite weight ratio of 0.35. It was then heated to 250° C. and maintained at this temperature for 1 hour prior to cooling. The obtained slurry was stored as hematite seeds material for iron removal tests. The major content of solid in the leached slurry was hematite. A slurry sample was taken for measurement of the solid concentration (% wt) and density. Then it was filtered, rinsed with a weak acid at pH 2 and dried at temperature range of 80° C. for chemical elementary assay and mineralogy investigation. The hematite content in the solid sample was identified with energy dispersive X-ray microanalysis (EDS) of polished sections using scanning electron microscope (SEM) and Quantitative X-ray powder diffraction (QXRD).

TABLE 1

Average Chemical Assay of Laterite Ore Samples

| % | Limonite | Saprolite |
|---|---|---|
| Al | 4.8 | 1.3 |
| As | <0.01 | <0.01 |
| Ca | 0.04 | 0.68 |
| Co | 0.087 | 0.028 |
| Cr | 2.3 | 0.73 |
| Cu | 0.02 | 0.01 |
| Fe | 45.3 | 15.1 |
| Mg | 1.2 | 15.6 |
| Mn | 0.84 | 0.24 |
| Na | <0.02 | <0.02 |
| Ni | 1.47 | 1.56 |
| Pb | <0.01 | <0.01 |
| S | 0.2 | <0.01 |
| Si | 2.4 | 18.2 |
| Zn | 0.04 | 0.01 |

Example 2: Iron Removal as Hematite from Pregnant Leach Solution (PLS)

A group of live tests were carried out in the same type 3 L glass reaction vessels described in Example 1. The weight ratio (dry) of limonite to saprolite in the atmospheric leach was kept as a constant of 1:1. Saprolite ore slurry was applied as one batch into the PLS prepared in Example 1 and the pH was raised to be about 2.5 for this iron removal and saprolite leach step. The dose of seeds was varied with different levels and defined as the seeds weight per 100 gram of added saprolite (dry weight). The leached slurry produced with pressure acid leach of Example 1 was used as hematite seeds to enhance the formation of hematite in the atmospheric leach. The ORP was controlled with $SO_2$ gas in the range of 500-900 my versus Pt/AgCl probe.

The pregnant leach solution (PLS) prepared in Example 1 was added to the reaction vessel and heated to 100° C. With designed weight ratio (1:1) of limonite over saprolite, 875 gram saprolite slurry with solid concentration of 25 wt % was separately preheated to ~80° C. then added to the reaction vessel. After 30 minutes, a given amount of hematite seeds was also added into reactor. The mixture was leached for 11 hours at the temperature range of 95-105° C. at atmospheric pressure. In a consecutive neutralisation stage, a stoichiometric amount of limestone slurry was added into the reactor to scavenge the residual ferric ion in solution for about half an hour.

Slurry samples were collected hourly. No extra acid was added because the acid released with iron precipitation was used to leach saprolite to dissolve more nickel. The slurry samples were centrifuged and liquid/solid separated for chemical elementary assay.

At the conclusion of the leach, the bulk slurry was filtered and the solid residue was rinsed with hot weak acid at pH 2. The solid residues were dried at 80° C. and submitted for chemical elementary assay and mineralogy investigation. The identification of input and output hematite amount was carried out with mineralogy techniques including energy dispersive X-ray microanalysis (EDS) of polished sections using scanning electron microscope (SEM) and Quantitative X-ray powder diffraction (QXRD). As shown in Table 2, the newly formed hematite in iron removal was calculated with the difference between input hematite amount as seeds and output hematite amount. The negative number indicated that a part of hematite seeds was converted into goethite or amorphous iron precipitation due to low seeds dose at atmospheric leaching conditions.

TABLE 2

Hematite Formation in Iron Removal Residue

| Test No. | 1 | 2 | 3 | 4 | 5 |
|---|---|---|---|---|---|
| Hematite seed dose (g/100 g saprolite) | 0 | 50 | 100 | 200 | 300 |
| Input hematite as seeds (g) | 0 | 37 | 73 | 146 | 219 |
| Output hematite (g) | 0 | 33 | 77 | 170 | 290 |
| Net hematite increase (g) | 0 | −7 | 4 | 24 | 71 |

Table 3 illustrates the distribution of major mineral phases in iron removal residue. It was observed that with increasing hematite seeds dose, both of the crystalline goethite phase and amorphous phase i.e. para-goethite and iron hydroxide decreases closing to zero, and hematite phase becomes a dominant phase.

TABLE 3

Distribution of Major Mineral Phases in Iron Removal Residue

| Test No. | 1 | 2 | 3 | 4 | 5 |
|---|---|---|---|---|---|
| Hematite seed dose (g/100 g saprolite) | 0 | 50 | 100 | 200 | 300 |
| Hydronium Jarosite | 0 | 10 | 7 | 4 | 2 |
| Hydrnium Alunite | 0 | 0 | 0 | 3 | 2 |
| Enstatite/Pyoxen | 19 | 2 | 7 | 11 | 9 |
| Forsterite | 16 | 2 | 1 | 5 | 8 |
| Goethite | 36 | 10 | 10 | 2 | 3 |
| Hematite | 0 | 18 | 36 | 67 | 77 |
| Lizardite | 9 | 0 | 0 | 0 | 0 |

TABLE 3-continued

Distribution of Major Mineral Phases in Iron Removal Residue

| Test No. | 1 | 2 | 3 | 4 | 5 |
|---|---|---|---|---|---|
| Amorphous phase | 20 | 57 | 38 | 8 | 0 |
| Total | 100 | 100 | 100 | 100 | 100 |

The invention claimed is:

1. A process for the removal of ferric iron as hematite from a nickel solution containing ferric and ferrous ions including the sequential steps of:
  (i) raising the temperature of the nickel solution to between about 90° C. and the boiling point of the nickel solution at atmospheric pressure;
  (ii) adjusting the pH of the nickel solution to be between about 2 and about 3; and
  (iii) adding a hematite seed to precipitate ferric ions as hematite in a predominantly crystalline form and to form a solution substantially free of ferric ions;
  (iv) recovering nickel from the solution substantially free of ferric ions, in an ion exchange step, to produce a nickel concentrated ion exchange eluate, and an ion exchange raffinate containing cobalt, ferrous ions, chromium, aluminum, manganese, and magnesium;
  (v) thereafter, removing ferrous ions from the raffinate of the ion exchange step by:
    (a) oxidizing ferrous ions to ferric ions by sparging the raffinate with air, oxygen or an air/oxygen mixture;
    (b) raising the temperature of the raffinate to be between about 40° C. and the boiling point;
    (c) adjusting the pH of the raffinate to between about 2 and about 3; and
    (d) adding a hematite seed to precipitate ferric ions as hematite in a predominantly crystalline form to form a slurry.

2. The process according to claim 1 wherein nickel is recovered in the ion exchange step using a continuous ion exchange device.

3. The process according to claim 1 wherein step (v)(b) comprises raising the temperature of the raffinate to be between 50° C. and 80° C.

4. The process according to claim 1 wherein step (ii) comprises adding a neutralizing agent to the nickel solution.

5. The process according to claim 4 wherein the neutralizing agent is limestone or saprolite.

6. The process according to claim 5 wherein saprolite is used as the neutralizing agent and the hematite seed used in step (iii) is added at a dose of at least a weight ratio of 1:1 to the added saprolite.

7. The process according to claim 5 wherein saprolite is used as the neutralizing agent and the hematite seed used in step (iii) is added at a dose of at least a weight ratio of 3:1 to the added saprolite.

8. The process according to claim 5 wherein limestone is used as the neutralizing agent and the hematite seed used in step (iii) is added at a dose by weight of 1:1 to 3:1 to the hematite formed during the precipitation of ferric ions as hematite in a predominantly crystalline form.

9. The process according to claim 8 wherein the limestone dose added is in a ratio of 1:1 to 1:1.3 of the stoichiometric weight of the ferric ions precipitated during the precipitation of ferric ions as hematite in a predominantly crystalline form.

10. The process according to claim 1 wherein the ion exchange step uses an ion exchange resin selected from a bis-picolylamine chelating resin or an iminodiacetate chelating resin.

11. The process according to claim 1 wherein cobalt is recovered from the ion exchange raffinate in a consecutive solvent exchange step with an organic reagent that includes a phosphinic acid.

12. The process according to claim 1 wherein the hematite seed used in step (v)(d) is added at a dose of at least a weight ratio of 1:1 to applied saprolite.

13. The process according to claim 12 wherein the hematite seed used in step (v)(d) is added at a dose of at least a weight ratio of 3:1 to applied saprolite.

14. The process according to claim 1 wherein the portion of the hematite containing slurry is returned to the nickel solution to act as a continuous hematite seed.

15. The process according to claim 1 wherein the pH of the slurry is raised to 6 with the addition of lime to precipitate out aluminum, chromium and some manganese, while any remaining ferric or ferrous iron will precipitate as hematite and/or magnetite.

16. The process according to claim 15, wherein the slurry undergoes a solid/liquid separation step to remove hematite and/or magnetite in a predominantly crystalline form, leaving a solution containing cobalt, magnesium and manganese.

17. The process according to claim 16 wherein cobalt is recovered from the solid/liquid separation step by either ion exchange or solvent extraction.

18. The process according to claim 17 wherein cobalt is recovered by a solvent extraction using step using an organic reagent that includes a phosphinic acid.

19. The process according to claim 17 wherein cobalt is recovered by an ion exchange step with a resin selected from the group consisting of a bis-picolylamine chelating resin and iminodiacetate chelating resin.

20. The process according to claim 19 wherein cobalt is recovered by an ion exchange step with a continuous ion exchange device.

* * * * *